United States Patent
Liao et al.

(10) Patent No.: US 12,441,861 B2
(45) Date of Patent: Oct. 14, 2025

(54) METHOD FOR IMPROVING RECOVERY RATE OF RECYCLED BIS(2-HYDROXYETHYL) TEREPHTHALATE

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Yu-Ti Tseng, Taipei (TW); Cheng-Hsun Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 635 days.

(21) Appl. No.: 17/872,287

(22) Filed: Jul. 25, 2022

(65) Prior Publication Data

US 2023/0081251 A1    Mar. 16, 2023

(30) Foreign Application Priority Data

Sep. 13, 2021  (TW) .................................. 110133987

(51) Int. Cl.
| C08G 63/00 | (2006.01) |
| C08J 11/14 | (2006.01) |
| C08J 11/16 | (2006.01) |

(52) U.S. Cl.
CPC ................ C08J 11/14 (2013.01); C08J 11/16 (2013.01); *C08J 2367/02* (2013.01)

(58) Field of Classification Search
USPC .......................... 528/190, 193, 194; 521/48.5
See application file for complete search history.

(56) References Cited

U.S. PATENT DOCUMENTS 7,211,193 B2 *  5/2007  Inada ...................... C07C 67/54
                                                          528/308.1
9,255,194 B2    2/2016  Allen et al.

FOREIGN PATENT DOCUMENTS

| CN | 100344604 C | 10/2007 |
| CN | 105367415 A | 3/2016 |
| CN | 110590551 A | 12/2019 |
| CN | 112724019 A | 4/2021 |
| CN | 112898155 A | 6/2021 |
| JP | 2005264113 A | 9/2005 |
| JP | 2008-88096 † | 4/2008 |
| JP | 200888096 A | 4/2008 |
| WO | WO01019775 A1 | 3/2001 |

\* cited by examiner
† cited by third party

*Primary Examiner* — Terressa Boykin
(74) *Attorney, Agent, or Firm* — Li & Cai Intellectual Property (USA) Office

(57) ABSTRACT

A method for improving a recovery rate of recycled bis(2-hydroxyethyl) terephthalate (BHET) is provided, which includes: providing a recycled polyester fabric; using a chemical de-polymerization liquid to chemically depolymerize the recycled polyester fabric, so as to form a de-polymerization product containing BHET; dissolving the BHET in water to form a aqueous phase liquid; cooling the aqueous phase liquid from a dissolution temperature to a first crystallization temperature, so as to crystallize at least a part of the BHET; and cooling the aqueous phase liquid from the first crystallization temperature to a second crystallization temperature, so as to crystallize at least another part of the BHET.

12 Claims, 1 Drawing Sheet

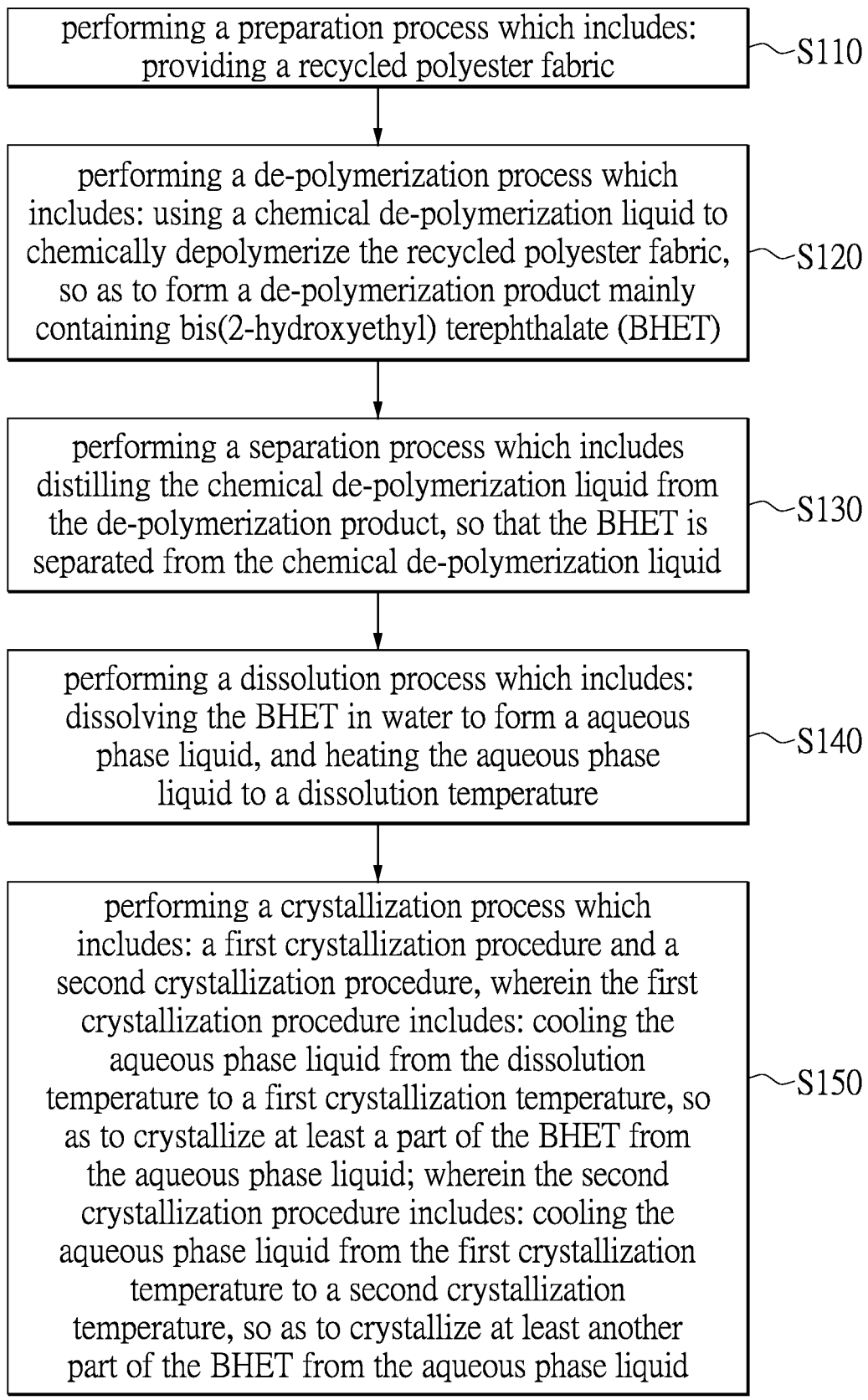

METHOD FOR IMPROVING RECOVERY RATE OF RECYCLED BIS(2-HYDROXYETHYL) TEREPHTHALATE

CROSS-REFERENCE TO RELATED PATENT APPLICATION

This application claims the benefit of priority to Taiwan Patent Application No. 110133987, filed on Sep. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for recycling a polyester material, and more particularly to a method for improving a recovery rate of recycled bis(2-hydroxyethyl) terephthalate (BHET).

BACKGROUND OF THE DISCLOSURE

In the related art, a chemical recycling method of a PET fabric primarily uses a chemical de-polymerization liquid (e.g., ethylene glycol) to chemically depolymerize the PET fabric, so as to form a de-polymerization product. The de-polymerization product mainly contains bis(2-hydroxyethyl) terephthalate (BHET). However, the aforementioned chemical recycling method requires complicated purification procedures to remove impurities (such as dyes) originally present in the PET fabric, so that the BHET can be re-polymerized to form high-quality recycled polyester chips (r-PET).

In the aforementioned BHET purification procedures, a conventional purification technology is to use activated carbon or an ion exchange resin to adsorb the impurities (such as dyes) in a crude BHET product that contains ethylene glycol (EG) before precipitation and purification of the BHET by a crystallization process. However, the conventional recycling method has disadvantages such as poor recovery quality (e.g., poor hue) and low recovery rate of the BHET, and high energy consumption.

U.S. Pat. No. 9,255,194 proposes a method for depolymerizing the PET fabric. Although the method proposed in this patent can completely remove dyes and other impurities whilst recycling catalysts, the method still needs complicated purification procedures for BHET purification, thereby resulting in a low recovery rate and a poor recovery quality of the BHET.

Patent No. CN 100,344,604 proposes a method for depolymerizing the PET fabric, and the method also requires complicated purification procedures for BHET purification, thereby resulting in an extremely high material recovery cost and a poor recovery quality of the BHET.

SUMMARY OF THE DISCLOSURE

In response to the above-referenced technical inadequacies, the present disclosure provides a method for improving a recovery rate of recycled bis(2-hydroxyethyl) terephthalate (BHET).

In one aspect, the present disclosure provides a method for improving a recovery rate of recycled BHET. The method includes: performing a preparation process, including: providing a recycled polyester fabric; performing a de-polymerization process, including: using a chemical de-polymerization liquid to chemically depolymerize the recycled polyester fabric, so as to form a de-polymerization product mainly containing bis(2-hydroxyethyl) terephthalate (BHET); performing a dissolution process, including: dissolving the BHET in water to form a aqueous phase liquid, and heating the aqueous phase liquid to a dissolution temperature; and performing a crystallization process, including: a first crystallization procedure and a second crystallization procedure. The first crystallization procedure includes: cooling the aqueous phase liquid from the dissolution temperature to a first crystallization temperature, so as to crystallize at least a part of the BHET from the aqueous phase liquid. Further, the second crystallization procedure includes: cooling the aqueous phase liquid from the first crystallization temperature to a second crystallization temperature, so as to crystallize at least another part of the BHET from the aqueous phase liquid.

In certain embodiments, in the dissolution process, a weight ratio of the BHET to the water is 1:3 to 1:20.

In certain embodiments, in the crystallization process, the first crystallization procedure includes: cooling the aqueous phase liquid from the dissolution temperature of between 70° C. and 150° C. to the first crystallization temperature of between 40° C. and 60° C. at a cooling rate of 5° C./min to 15° C./min (preferably at a cooling rate of 7° C./min to 12° C./min) for crystallization. Further, the second crystallization procedure includes: cooling the aqueous phase liquid from the first crystallization temperature of between 40° C. and 60° C. to the second crystallization temperature of between 0 and 20° C. at a cooling rate of 0.10° C./min to 0.30° C./min (preferably at a cooling rate of 0.12° C./min to 0.25° C./min) for crystallization. The crystallization process allows at least 85% of the BHET in the aqueous phase liquid to be crystallized and have a purity of not less than 99.0%.

In certain embodiments, the first crystallization procedure crystallizes 62.2% to 97.1% of the BHET, and the second crystallization procedure crystallizes 2.8% to 37.7% of the BHET so that the entire crystallization process allows at least 85% of the BHET to be crystallized and have a purity of not less than 99.0%.

In certain embodiments, in the crystallization process, the first crystallization procedure includes: using a cooling water to cool the aqueous phase liquid from the dissolution temperature to the first crystallization temperature. Further, the second crystallization procedure includes: using a chilled water to cool the aqueous phase liquid from the first crystallization temperature to the second crystallization temperature.

In certain embodiments, in the crystallization process, the first crystallization procedure includes: filtering and taking out the BHET crystallized from the aqueous phase liquid, and the second crystallization procedure includes: cooling the filtered aqueous phase liquid from the first crystallization temperature to the second crystallization temperature.

In certain embodiments, in the de-polymerization process, the chemical de-polymerization liquid is used to chemically depolymerize the recycled polyester fabric when a de-polymerization catalyst is present. The de-polymerization catalyst is a metal catalyst, and the chemical de-polymerization liquid is ethylene glycol (EG). The chemical de-polymerization liquid is heated to a de-polymerization temperature to chemically depolymerize the recycled polyester fabric, where the de-polymerization temperature is between 180° C. and 260° C.

In certain embodiments, the method further includes: performing a drying process, including: drying the BHET crystallized by the crystallization process to obtain a recycled BHET.

In certain embodiments, the recycled BHET has an L value of not less than 90, an a value of between −1.0 and 1.0 and a b value of between −2.0 and 2.0.

In certain embodiments, the dissolution process further includes: adding an activated carbon material into the aqueous phase liquid to adsorb impurities originally present in the recycled polyester fabric, so as to improve a purity of the BHET in the aqueous phase liquid.

Therefore, in the method for improving the recovery rate of the recycled BHET provided by the present disclosure, by virtue of "providing a recycled polyester fabric; using a chemical de-polymerization liquid to chemically depolymerize the recycled polyester fabric, so as to form a de-polymerization product containing BHET; dissolving the BHET in water to form a aqueous phase liquid; cooling the aqueous phase liquid from a dissolution temperature to a first crystallization temperature, so as to crystallize at least a part of the BHET; and cooling the aqueous phase liquid from the first crystallization temperature to a second crystallization temperature, so as to crystallize at least another part of the BHET," a recovery quality and the recovery rate of the recycled BHET can be improved. Further, the method provided by the present disclosure has an advantage of low energy consumption for the crystallization process.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for improving a recovery rate of recycled BHET according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Improving Recovery Rate of Recycled BHET]

A common polyester fabric is often attached with impurities (such as dyes). In order to recycle the polyester fabric, a chemical de-polymerization liquid (e.g., ethylene glycol) is conventionally used to chemically depolymerize the polyester fabric, so as to form a de-polymerization product mainly containing bis(2-hydroxyethyl) terephthalate (BHET).

Further, in order to purify the BHET, a conventional purification method is to use activated carbon to adsorb the impurities (such as dyes) in a crude BHET product that contains ethylene glycol (EG) before crystallization of the BHET. A conventional recycling method has disadvantages such as poor recovery quality (e.g., poor hue) and low recovery rate of the BHET, and high energy consumption (particularly for a crystallization process process).

In response to the aforementioned technical inadequacies, referring to FIG. 1, an embodiment of the present disclosure provides a method for improving a recovery rate of recycled BHET. The method can effectively improve the recovery quality and the recovery rate of the recycled BHET. Further, the method has an advantage of low energy consumption. The method includes a step S110, a step S120, a step S130, a step S140, and a step S150. It should be noted that the sequence of the steps and actual ways of process described in this embodiment can be adjusted according to practical requirements, and are not limited thereto.

The step S110 includes: performing a preparation process. The preparation process includes: providing a recycled polyester fabric attached with impurities. The impurities can be, for example, dyes and/or water repellents, but the present disclosure is not limited thereto.

For instance, the recycled polyester fabric can have a color (e.g., black, red and blue) through being dyed with a dye. Further, the recycled polyester fabric can obtain a water-repellent function through treatment of a water repellent.

The dye can be, for example, at least one of natural dyes and synthetic dyes, or at least one of physical dyes and chemical dyes.

Further, the water repellent can have, for example, a polymer network crosslinked structure. The water repellent can be, for example, a water repellent containing silicon (Si), a water repellent containing fluorine (F), a water repellent containing fluorine and silicon, or a waterborne polyurethane (PU) water repellent, but the present disclosure is not limited thereto.

In one embodiment of the present disclosure, the recycled polyester fabric is dyed to obtain an L value of greater than 0 and not greater than 30. That is, the recycled polyester fabric has a relatively dark color, but the present disclosure is not limited thereto. It should be noted that the aforementioned L value is a parameter value that represents brightness (also known as whiteness of a color) in a Lab color space.

The step S120 includes: performing a de-polymerization process. The de-polymerization process includes: using a chemical de-polymerization liquid to chemically depolymerize the recycled polyester fabric to form a de-polymerization product mainly containing bis(2-hydroxyethyl) terephthalate (BHET). Further, the de-polymerization product also contains oligomers, the chemical de-polymerization liquid and the impurities.

More specifically, the chemical de-polymerization liquid can be, for example, ethylene glycol (EG). The recycled polyester fabric can be chemically depolymerized through, for example, an EG de-polymerization method, so that the recycled polyester fabric can be depolymerized to form the de-polymerization product mainly containing the BHET. Further, the de-polymerization product also contains oligomers formed by depolymerizing the polyester fabric, the aforementioned chemical de-polymerization liquid (e.g., ethylene glycol) for de-polymerization, and impurities originally existing in the recycled polyester fabric.

It is worth mentioning that the BHET is an intermediate between pure terephthalic acid (PTA) and ethylene glycol (EG). Further, the BHET can also be used as a raw material for synthesizing polyester (PET), and be generated into a polyester copolymer with other monomers.

In one embodiment of the present disclosure, the chemical de-polymerization liquid is used to chemically depolymerize the recycled polyester fabric in the presence of a de-polymerization catalyst. The de-polymerization catalyst can be, for example, a metal catalyst, but the present disclosure is not limited thereto. It is worth mentioning that the de-polymerization catalyst can assist in reducing activation energy of the chemical de-polymerization liquid during chemical depolymerization of the polyester fabric. From another perspective, the de-polymerization catalyst can assist in improving the efficiency of the chemical de-polymerization liquid for chemically depolymerizing the recycled polyester fabric.

In one embodiment of the present disclosure, the metal catalyst can be, for example, at least one material selected from group consisting of zinc acetate, lead acetate, cadmium acetate, calcium acetate, barium acetate, sodium acetate, lithium hydroxide, mercury acetate, copper acetate, and iron acetate, but the present disclosure is not limited thereto.

Or, in one embodiment of the present disclosure, the metal catalyst can be, for example, an organo titanium metal catalyst. The metal catalyst can also be, for example, an ionic liquid catalyst, but the present disclosure is not limited thereto.

In one embodiment of the present disclosure, the chemical de-polymerization liquid is heated to a de-polymerization temperature to chemically depolymerize the recycled polyester fabric. The de-polymerization temperature is preferably between 180° C. and 260° C., and more preferably between 210° C. and 240° C. At the aforementioned de-polymerization temperature, the efficiency of the chemical de-polymerization liquid for chemically depolymerizing the recycled polyester fabric can be improved in a more effective manner, and the metal catalyst can exert a greater catalytic function.

The step S130 includes: performing a separation process. The separation process includes: distilling the chemical de-polymerization liquid from the de-polymerization product, so that the BHET is separated from the chemical de-polymerization liquid.

More specifically, in the separation process, the de-polymerization product is heated to an evaporation temperature, so as to distill the chemical de-polymerization liquid from the de-polymerization product. The chemical de-polymerization liquid is ethylene glycol (EG). Further, the evaporation temperature is preferably between 150° C. and 250° C., and more preferably between 160° C. and 220° C.

It is worth mentioning that, in the de-polymerization product formed by the de-polymerization process (step S120), a boiling point of the chemical de-polymerization liquid is often lower than a boiling point of the BHET. Specifically, the boiling point of the chemical de-polymerization liquid is approximately between 180° C. and 220° C., and the boiling point of the BHET is approximately between 380° C. and 420° C., but the present disclosure is not limited thereto.

Accordingly, in the separation process, through different components in a mixed liquid having different boiling points, the chemical de-polymerization liquid with a lower boiling point can be distilled from the de-polymerization product by evaporation. In this way, a purity of the BHET in the de-polymerization product can be effectively improved. It should be noted that the impurities originally existing in the recycled polyester fabric will remain in the de-polymerization product after the separation process. To remove these impurities, adsorption by the activated carbon is carried out later on.

The step S140 includes: performing a dissolution process. The dissolution process includes: dissolving the BHET in water to form a aqueous phase liquid, and heating the aqueous phase liquid to a dissolution temperature, so as to improve solubility of the BHET in the water.

Then, in order to remove the impurities (e.g., organic dyes) originally existing in the recycled polyester fabric, the dissolution process can further include: adding an activated carbon material to the aqueous phase liquid so that the activated carbon material can be used to adsorb the impurities. Accordingly, the impurities can be removed from the de-polymerization product, and the purity of the BHET in the aqueous phase liquid can be effectively improved.

In order to improve an adsorption efficiency of the activated carbon material with respect to the impurities (e.g., organic dyes), a specific surface area of the activated carbon material is preferably between 400 $m^2$/g and 4,000 $m^2$/g, and more preferably between 800 $m^2$/g and 2,000 $m^2$/g.

In one embodiment of the present disclosure, in order to effectively dissolve the BHET in the water, a weight ratio of the BHET to the water is preferably 1:3 to 1:20, and more preferably from 1:4 to 1:15. That is to say, in the aqueous phase liquid, a weight of the water is preferably 3 times to 20 times (and more preferably 4 times to 15 times) a weight of the BHET.

In one embodiment of the present disclosure, in order to improve the adsorption efficiency of the activated carbon material with respect to the impurities (e.g., organic dyes), a weight ratio range of the activated carbon material to the BHET is preferably from 1:10 to 1:200, and more preferably from 1:20 to 1:150. That is to say, in the aqueous phase liquid, the weight of the BHET is preferably 10 times to 200 times (and more preferably 20 times to 150 times) a weight of the activated carbon material.

In one embodiment of the present disclosure, the aqueous phase liquid is heated to the dissolution temperature, so that the BHET is more effectively dissolved in the water. In addition, the activated carbon material can adsorb the impurities more effectively at this temperature. The dissolution temperature is preferably between 70° C. and 150° C., and more preferably between 80° C. and 130° C.

It is worth mentioning that, in the dissolution process, the BHET can be dissolved in the water, and water-insoluble polymers in the de-polymerization product can be precipitated. In this way, the BHET can be effectively separated from the polymers.

In addition, in order to facilitate a crystallization process that follows, the activated carbon material can first be filtered through a filter screen, so that the BHET is separated from the activated carbon material attached with impurities.

The step S150 includes: performing the crystallization process. The crystallization process includes: cooling the aqueous phase liquid to crystallize the BHET from the aqueous phase liquid, so as to obtain the recycled BHET.

More specifically, the crystallization process sequentially includes: a first crystallization procedure and a second crystallization procedure. The first crystallization procedure includes: cooling the aqueous phase liquid from the dissolution temperature to a first crystallization temperature to crystallize at least a part of the BHET from the aqueous phase liquid. The second crystallization procedure includes: cooling the aqueous phase liquid from the first crystallization temperature to a second crystallization temperature to crystallize at least another part of the BHET from the aqueous phase liquid.

In one embodiment of the present disclosure, the dissolution temperature is preferably between 70° C. and 150° C., and more preferably between 80° C. and 130° C. The first crystallization temperature is preferably between 40° C. and 60° C., and more preferably between 40° C. and 50° C. The second crystallization temperature is preferably between 0° C. and 20° C., and more preferably between 0° C. and 10° C.

That is to say, the first crystallization procedure includes: cooling the aqueous phase liquid from the dissolution temperature of between 70° C. and 150° C. to the first crystallization temperature of between 40° C. and 60° C. at a cooling rate of 5° C./min to 15° C./min for crystallization. Further, the second crystallization procedure includes: cooling the aqueous phase liquid from the first crystallization temperature of between 40° C. and 60° C. to the second crystallization temperature of between 0° C. and 20° C. at a cooling rate of 0.10° C./min to 0.30° C./min for crystallization.

In one embodiment of the present disclosure, the first crystallization procedure can crystallize 62.2% to 97.1% of the BHET, and the second crystallization procedure can crystallize 2.8% to 37.7% of the BHET, so that the entire crystallization process allows at least 85% of the BHET to be crystallized.

In one embodiment of the present disclosure, the first crystallization procedure includes: using a cooling water to cool the aqueous phase liquid from the dissolution temperature to the first crystallization temperature, and filtering and removing the BHET before a mother liquor enters the second crystallization procedure.

The second crystallization procedure includes: using a chilled water to cool the aqueous phase liquid from the first crystallization temperature to the second crystallization temperature. The aforementioned process can improve an overall yield and purity of the BHET and reduce the cost.

It is worth mentioning that, during use of an industrial water chiller, the cooling water and the chilled water are often involved. The cooling water refers to a condenser cooling water at a temperature of 15° C. to 45° C., and the chilled water refers to the condenser cooling water at a temperature of −10° C. to 15° C.

In one embodiment of the present disclosure, in the crystallization process, the first crystallization procedure includes: filtering and taking out the BHET crystallized from the aqueous phase liquid, and the second crystallization procedure includes: cooling the filtered aqueous phase liquid from the first crystallization temperature to the second crystallization temperature. That is to say, before the second crystallization procedure, the first crystallization procedure can, for example, firstly filter and take out the crystallized BHET. In this way, the crystallization process can improve a crystallization efficiency of the BHET, but the present disclosure is not limited thereto.

More specifically, in the embodiment of the present disclosure, the method can further include: performing a drying process. The drying process includes: drying all of the BHET crystallized by the crystallization process in an oven, so as to obtain the recycled BHET.

Based on the aforementioned configuration, the recycled BHET has a good hue, a good recovery quality and a high recovery rate. Further, the method provided in the embodiment of the present disclosure has an advantage of low energy consumption.

Specifically, the recycled BHET has an L value of not less than 90, an a value of between −1.0 and 1.0 and a b value of between −2.0 and 2.0. Further, the recycled BHET has a BHET recovery rate of not less than 85% and a purity of not less than 99.0%.

It should be noted that, based on CIE XYZ color space coordinates that are nonlinear compression, the Lab color space is a color-opposite space (in which a dimension L represents brightness, and a and b represent color opposite dimensions).

EXPERIMENTAL DATA AND TEST RESULTS

In order to prove that the method for improving the recovery rate of the recycled BHET according to the embodiment of the present disclosure has a good recovery effect, Examples 1-3 and Comparative examples 1-3 are used below for description.

Example 1

1 kg of a PET fabric, 6 kg of ethylene glycol and 20 g of a zinc acetate catalyst are put into a 10 L three-necked glass bottle for being heated to 190° C. and stirred for 6 hours. Then, this reaction mixture is heated to reach and be maintained at a boiling condition (195° C. to 210° C.). Surplus EG is distilled out, so that a residual amount of the EG in the reaction mixture is less than 5%.

After the reaction mixture is cooled to 90° C., 7 kg of water is added and heated to 90° C., so that BHET is dissolved in the water. 30 g of activated carbon is added, and said mixture is stirred for 1 hour with the temperature being maintained at 90° C., so as to adsorb impurities (such as dyes). Then, the activated carbon is filtered out.

The BHET-containing aqueous solution at 90° C. is cooled to 50° C. by using a cooling water, so as to crystallize the BHET at a cooling rate of 10° C./min. Then, solid BHET is filtered out before a mother liquor is subjected to second-stage cooling and crystallization.

The BHET-containing aqueous solution at 50° C. is cooled to 5° C. by using a chilled water, so as to crystallize the BHET at a cooling rate of 0.2° C./min. Then, solid BHET is filtered out.

After mixing and drying of the BHET at a first stage and a second stage, the quality of the BHET is: L=92%, a=0.5, and b=1.3 (with a yield of 90.0% and a purity of 99.5%).

Example 2

Compared with Example 1, a cooling temperature at the first stage is reduced from 90° C. to 60° C., rather than from 90° C. to 50° C. Other processing conditions are the same. Quality of BHET: L=91%, a=0.7, and b=1.5 (with a yield of 89.7% and a purity of 99.2%).

Example 3

Compared with Example 1, the cooling temperature at the first stage is reduced from 90° C. to 40° C., rather than from 90° C. to 50° C. Other processing conditions are the same.
Quality of BHET: L=91.2%, a=0.9, and b=1.7 (with a yield of 89.7% and a purity of 99.4%).

Comparative Example 1

1 kg of a PET fabric, 6 kg of ethylene glycol and 20 g of a zinc acetate catalyst are put into a 10 L three-neck glass bottle for being heated to 190° C. and stirred for 6 hours. Then, this reaction mixture is heated to reach and be maintained at a boiling condition (195° C. to 210° C.). Surplus EG was distilled out so that a residual amount of the EG in the reaction is less than 5%.

After the reaction mixture is cooled to 90° C., 7 kg of water is added and heated to 90° C. so that BHET is dissolved in the water. 30 g of activated carbon is added, and said mixture is stirred for 1 hour with the temperature being maintained at 90° C., so as to adsorb impurities (such as dyes). Then, the activated carbon was filtered out.

The BHET-containing aqueous solution at 90° C. is cooled to 5° C. by using a chilled water, so as to crystallize the BHET at a cooling rate of 0.2° C./min. Then, solid BHET is filtered out and dried.

Quality of BHET: L=83.8%, a=1.1, and b=3.9 (with a yield of 89.7% and a purity of 98.2%).

Comparative Example 2

1 kg of a PET fabric, 6 kg of ethylene glycol and 20 g of a zinc acetate catalyst are put into a 10 L three-neck glass bottle for being heated to 190° C. and stirred for 6 hours. Then, this reaction mixture is heated to reach and be maintained at a boiling condition (195° C. to 210° C.). Surplus EG is distilled out so that a residual amount of EG in the reaction mixture is less than 5%.

After the reaction is cooled to 90° C., 7 kg of water is added and heated to 90° C. so that BHET was dissolved in the water. 30 g of activated carbon is added, and said mixture is stirred for 1 hour with the temperature being maintained at 90° C., so as to adsorb impurities (such as dyes). Then, the activated carbon was filtered out.

The BHET-containing aqueous solution at 90° C. is cooled to 35° C. by using a cooling water, so as to crystallize the BHET at a cooling rate of 0.4° C./min. Then, solid BHET is filtered out and dried.

Quality of BHET: L=84.3%, a=0.9, and b=3.8 (with a yield of 77.4% and a purity of 98.8%).

Comparative Example 3

Compared with Comparative example 1, the BHET-containing aqueous solution at 90° C. is cooled to 15° C. by using a chilled water, so as to crystallize the BHET. Other processing conditions are the same.

Quality of BHET: L=84.3%, a=1.1, and b=4.4 (with a yield of 82.6% and a purity of 97.8%).

Beneficial Effects of the Embodiments

In conclusion, in the method for improving the recovery rate of the recycled BHET provided by the present disclosure, by virtue of "providing a recycled polyester fabric; using a chemical de-polymerization liquid to chemically depolymerize the recycled polyester fabric, so as to form a de-polymerization product containing BHET; dissolving the BHET in water to form a aqueous phase liquid; cooling the aqueous phase liquid from a dissolution temperature to a first crystallization temperature, so as to crystallize at least a part of the BHET; and cooling the aqueous phase liquid from the first crystallization temperature to a second crystallization temperature, so as to crystallize at least another part of the BHET," a recovery quality and the recovery rate of the recycled BHET can be improved. Further, the method provided by the present disclosure has an advantage of low energy consumption for the crystallization process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for improving a recovery rate of recycled bis(2-hydroxyethyl) terephthalate (BHET), comprising:
    performing a preparation process which includes: providing a recycled polyester fabric;
    performing a de-polymerization process which includes: using a chemical de-polymerization liquid to chemically depolymerize the recycled polyester fabric, so as to form a de-polymerization product mainly containing bis(2-hydroxyethyl) terephthalate (BHET);
    performing a separation process which includes: distilling the chemical de-polymerization liquid from the de-polymerization product under an evaporation temperature of between 150° C. and 250° C., so as to separate the BHET from the chemical de-polymerizaiton liquid;
    performing a dissolution process which includes: dissolving the BHET in water to form an aqueous phase liquid, and heating the aqueous phase liquid to a dissolution temperature of between 70° C. and 150° C.; wherein a weight ratio of the BHET to the water ranges from 1:3 to 1:20;
    performing a crystallization process which includes: a first crystallization procedure and a second crystallization procedure,
    wherein the first crystallization procedure includes: cooling the aqueous phase liquid from the dissolution temperature to a first crystallization temperature of between 40° C. and 60° C. at a cooling rate of 5° C./min to 15° C./min, so as to crystallize at least a part of the BHET from the aqueous phase liquid; and wherein the second crystallization procedure includes: cooling the aqueous phase liquid from the first crystallization temperature to a second crystallization temperature of between 0° C. and 20° C. at a cooling rate of 0.10° C./min to 0.30° C./min, so as to crystallize at least another part of the BHET from the aqueous phase liquid.

2. The method according to claim 1, wherein in the dissolution process, the weight ratio of the BHET to the water ranges from 1:4 to 1:15.

3. The method according to claim 1, wherein in the crystallization process, the first crystallization procedure includes: cooling the aqueous phase liquid from the dissolution temperature to the first crystallization temperature at the cooling rate of 7° C./min to 12° C./min.

4. The method according to claim 3, wherein in the crystallization process, the second crystallization procedure includes: cooling the aqueous phase liquid from the first crystallization temperature to the second crystallization temperature at the cooling rate of 0.12° C./min to 0.25° C./min.

5. The method according to claim 4, wherein the crystallization process allows at least 85% of the BHET in the aqueous phase liquid to be crystallized and have a purity of not less than 99.0%.

6. The method according to claim 4, wherein the first crystallization procedure crystallizes 62.2% to 97.1% of the BHET, and the second crystallization procedure crystallizes 2.8% to 37.7% of the BHET, so that the entire crystallization process allows at least 85% of the BHET to be crystallized and have a purity of not less than 99.0%.

7. The method according to claim 4, wherein in the crystallization process, the first crystallization procedure includes: using a cooling water to cool the aqueous phase liquid from the dissolution temperature to the first crystallization temperature; wherein the cooling water refers to a condenser cooling water at a temperature of 15° C. to 45° C.; wherein the second crystallization procedure includes: using a chilled water to cool the aqueous phase liquid from the first crystallization temperature to the second crystallization temperature; wherein the chilled water refers to the condenser cooling water at a temperature of −10° C. to 15° C.

8. The method according to claim 1, wherein in the crystallization process, the first crystallization procedure includes: filtering and taking out the BHET crystallized from the aqueous phase liquid, and the second crystallization procedure includes: cooling the filtered aqueous phase liquid from the first crystallization temperature to the second crystallization temperature.

9. The method according to claim 1, wherein in the de-polymerization process, the chemical de-polymerization liquid is used to chemically depolymerize the recycled polyester fabric when a de-polymerization catalyst is present; wherein the de-polymerization catalyst is a metal catalyst, and the chemical de-polymerization liquid is ethylene glycol (EG); wherein the chemical de-polymerization liquid is heated to a de-polymerization temperature to chemically depolymerize the recycled polyester fabric, and the de-polymerization temperature is between 190° C. and 260° C.

10. The method according to claim 1, further comprising: performing a drying process which includes: drying the BHET crystallized by the crystallization process, so as to obtain the recycled BHET.

11. The method according to claim 10, wherein the recycled BHET has an L value of not less than 90, an a value of between −1.0 and 1.0, and a b value of between −2.0 and 2.0.

12. The method according to claim 1, wherein the dissolution process further includes: adding an activated carbon material into the aqueous phase liquid to adsorb impurities originally present in the recycled polyester fabric, so as to improve a purity of the BHET in the aqueous phase liquid.

* * * * *